3,159,593
PROCESS FOR THE PRODUCTION OF A LONG-LASTING STABLE SOLUTION OF FORMALDE-HYDE-MELAMINE CONDENSATION PRODUCTS, AND THE NEW STABLE PRODUCT THEREOF
Marcello Morini, Legnano, and Tito Sabatini, Castellanza, Varese, Italy, assignors to Montecatini Società Generale per l'Industria Mineraria e Chimica, Milan, Italy
No Drawing. Filed May 17, 1960, Ser. No. 29,557
Claims priority, application Italy, May 19, 1959, 8,435/59
7 Claims. (Cl. 260—29.4)

This invention relates to a process of making a more stable solution of formaldehyde-melamine condensation products, and to the product so made.

Presently known solutions of formaldehyde-melamine condensation products are stable only for a limited period of time. For this reason, in industrial practice solutions of such products are dehydrated in suitable spray driers and the resins themselves are sold in the form of dry powders having a shelf-life of about one year, provided that they are protected against humidity and heat. A process of this kind involves appreciable expense in the production of melamine resins. Moreover, the user for certain applications prefers to have such resins available in the form of a solution.

Several proposals have therefore been made to render the solutions stable within sufficiently wide limits of time. They are reported in the patent literature.

For example, it is reported that solutions having some stability can be obtained by carrying out the reaction of melamine with formaldehyde under special operating conditions and subsequently buffering the syrups obtained with borax. An analogous result is indicated as obtained by condensing melamine with formaldehyde in the presence of urea or thiourea. Finally, solutions are known of melamine-formaldehyde condensation products etherified with low molecular weight aliphatic alcohols miscible with water. The latter solutions are mainly used as auxiliary substances in the textile industry. An object of the present invention is to provide an improved process for the preparation of a solution of products of condensation of melamine with formaldehyde having stability of long duration. These products are obtained by a melamine-formaldehyde condensation, with subsequent modification of the condensate by addition of sulphamides. The new stable solutions can be kept for several months at 15 to 20° C. (room temperature) without losing their technological application characteristics. They are particularly suitable for the impregnation of fibrous materials such as paper, textiles and wood, which are to be subjected to hot pressing for obtaining various laminated and stratified products.

It is known from the literature to use sulphamides, in particular ortho- or para-toluene sulphamide (i.e., sulfonamide) individually or in trade mixtures, to confer particular thermoplastic characteristics to melamine-formaldehyde resins. The resins thus modified are used in the manufacturing of post-mouldable laminates.

It has now been found that if ortho- or para-toluene-sulphamide, or a mixture of the two, is added to a melamine-formaldehyde condensation product, having a certain degree of condensation and dissolved in an aqueous alcoholic, alkaline medium, and the reaction is continued for a certain time in the presence of the modifying agent, syrups are obtained which are stable for sufficiently long periods of time to meet commercial requirements.

The process is characterized in that melamine and formaldehyde in a 1:2 to 1:4 molecular ratio are made to react, for example at 70 to 140° C., preferably at 80 to 90° C. in an alkaline medium and in the presence of an aliphatic, mono- or polyhydroxy alcohol, miscible with water, and having less than 4 carbon atoms in the molecule, up to a certain degree of condensation.

The progress of the condensation is followed by determining, at intervals, the miscibility of a sample of syrup with water at 15° C. As a particular case, when one volume of the syrup becomes turbid by dilution with 1 to 10, preferably 3 to 5, volumes of water at 15° C., the modifying sulphamide is added to the reaction mass in a proportion of 0.05 to 0.15 mol, preferably of 0.10 mol, per each mol of melamine present.

The reaction is carried on until there is complete dissolution of the modifying agent. The syrup is then rapidly cooled in its pH adjusted, as stated below. By adding deionized water to the syrup, the concentration in solids of the same is brought to the desired volume. If desired the syrup may be further diluted with small percent amounts of methanol or ethanol.

To carry out the process of the invention, normal solutions of formaldehyde can be used, containing 36% by weight of $CH_2O$. The condensation pH (that is, the pH of the formaldehyde prior to the addition of the other ingredients) should be alkaline and preferably included between a value of 7.5 and 10.0, and advantageously between 8.5 and 9.5.

Preferably, the formaldehyde is used in such a quantity as to have each $NH_2$ group of the melamine-formaldehyde mixture correspond to 0.7 to 1 mol of formaldehyde.

The preferred molecular ratio of melamine to formaldehyde ranges from 1:2 to 1:4. The pH of the finished syrup should preferably be adjusted to a value ranging between 8.5 and 10.0, advantageously between 9.0 and 9.5. These values are intended as measured with the aid of a glass electrode pH metering apparatus.

The aliphatic alcohol miscible with water should advantageously be present in the initial reaction mixture in a proportion of 0.2 to 2.0 mols of alcohol per each mol of melamine.

Polyhydroxy alcohols have particular influence upon the finished product at low temperatures. Stability at low temperatures is obtained by addition of 1 to 10‰ by weight of glycerol, calculated on the finished syrup, preferably of from 2 to 4‰.

As said, ortho- or para-toluene sulfonamide, or a trade mixture of these two substances, is used, as a sulphamide.

The following examples illustrate the invention, but are not intended to limit it.

The parts and percentages are by weight, unless otherwise indicated.

*Example 1*

Into an autoclave provided with a stirrer, a refluxing cooler and a thermometer, 254 parts of a 36% aqueous solution of formaldehyde are introduced. The pH of the solution is adjusted to a value ranging between 8.7 and 8.9 with a sodium carbonate solution, and heating is begun. When the solution has attained a temperature of about 70° C., 126 parts of melamine are poured into the autoclave. The temperature is further raised to 80° C. and, when the melamine is completely dissolved, 32 parts of methanol and 1.12 parts of glycerol are added. The reaction is carried on at 90° C. until a test volume of syrup becomes turbid when diluted with 10 volumes of water.

At this time, 17.0 parts of a mixture of ortho- and paratoluene sulfonamides of trade or technical grade are poured into the autoclave, and the reaction is continued until there is complete dissolution of the sulfonamide. Subsequently, the syrup is cooled as quickly as possible and its pH adjusted to 9.2. The syrup is diluted with 157 parts of water to bring its solid contents to 50%.

The resin solution thus obtained has a density $D_4^{20}=1.90$ g./cm.$^3$ and a viscosity at 20° C. of 37 cp.

It is stable and maintains its application characteristics unvaried after having been kept for 40 days at 20° C. At the temperature of 0° C., after few hours, it shows turbidity which progressively becomes irreversible.

Example 2

Into a reaction autoclave provided with a stirrer, a refluxing cooler and a thermometer, 260 parts of a 36% aqueous solution of formaldehyde are introduced. The pH of the solution is adjusted to a value ranging between 8.7 and 8.8 with a sodium carbonate solution, and heating is started. When the solution has attained a temperature of about 70° C., 126 parts of melamine are poured into the autoclave. The temperature is allowed to rise to 90° C. and when the melamine has completely dissolved, 32 parts of methanol and 1.15 parts of glycerol are added.

The reaction is carried on at 90° C. until one volume of syrup becomes turbid if diluted with 10 volumes of water. At this time, 17.0 parts of a commercially available mixture of ortho- and paratoluene sulfonamide are poured into the autoclave. As soon as the sulfonamide has dissolved in the reaction mass, the syrup is cooled as quickly as possible and its pH is adjusted to a value between 9.0 and 9.3. The syrup diluted with water, to a 50% solids concentration, has the following characteristics:

Viscosity at 20° C. _____ 40 cp. (centipoises).
$D_4^{20}$ _____ 1.187 g./cc.

It is stable and maintains its technological application characteristics unvaried after having been kept for two months at 20° C. It can tolerate temperatures of the order of 0° C. for some days.

Example 3

254 parts of a 36% aqueous solution of formaldehyde having its pH adjusted at 8.8 with aqueous sodium carbonate solution, are heated up to 70° C. When this temperature is reached, 126 parts of melamine are added and the temperature is allowed to rise to 80° C. When the melamine has completely dissolved, 32 parts of ethanol and 1 part of glycerol are added and the reaction is carried on until a test volume of syrup becomes turbid if diluted with 5 volumes of water.

At this time, 17 parts of a commercial mixture of ortho- and paratoluene sulfonamides are introduced into the autoclave and the reaction is carried on until the sulfonamide has completely dissolved. Then the syrup is cooled as quickly as possible and its pH is adjusted to 9.2. The syrup diluted with water to a 50% solids concentration is stable and maintains its application characteristics unvaried after having been kept for 60 days at 20° C.

Example 4

The same results can be obtained if operating as in the preceding examples, by adding, when the melamine is dissolved, 32 p. of a 1:1 mixture of ethanol and methanol and 1.5 p. of glycerol. Also in this case the syrup appears stable and keeps its characteristics for application unaltered after 70 days' stay at 20° C. and can tolerate temperatures of the order of 0° C. for some days.

Example 5

258 p. of a 36% solution of formaldehyde having its pH adjusted at 8.7 to 8.9 with sodium carbonate, are heated up to 70° C.

When this temperature is reached 126 p. of melamine are added and temperature is allowed to rise to 90° C. When melamine has completely dissolved, 32 p. of methanol are added and the reaction is carried on at 90° C., until one volume of syrup becomes turbid if diluted with 1 volume of water at 15° C.

At this time, 17.0 p. of a commercial mixture of o- and p-toluene sulphamide are introduced into the autoclave. As soon as the sulphamide has dissolved in the reaction mass, the syrup is cooled as quickly as possible and its pH is adjusted to a value between 9.0 and 9.3.

The syrup diluted with water to a 50% solids concentration has the following characteristics:

V at 20° C. _____ cp__ 45
$D_4^{20}$ _____ g./cc__ 1.190

It appears stable after 75 days' preservation at 20° C., and has excellent stability at low temperatures.

Example 6

Syrups having the same characteristics as in the preceding example are obtained if under equal other operating conditions as in the preceding examples (amounts of reactants, pH and degree of condensation) ortho- or para-toluene sulphamide in an amount of 0.1 mol per mol of melamine is employed. Also in this case the product appears stable for a time longer than 60 days and has excellent stability at temperatures of the order of 0° C.

We claim:

1. A process for the preparation of a stable solution of a product of condensation of melamine with formaldehyde obtained by reacting melamine and formaldehyde in molecular ratios ranging between 1:2 and 1:4 to give a partial condensation product, consisting essentially of adding, as a stabilizing agent, an aromatic sulphamide to the partial condensation product in aqueous alcoholic medium in a proportion of 0.05 to 0.15 mol of sulphamide per mol of melamine, the melamine-formaldehyde partial condensation product being obtained by reacting melamine and formaldehyde at 70 to 140° C. at a pH from 7.5 to 10.0 and in the presence of an aliphatic alcohol having less than 4 carbon atoms and continuing the condensation at least until the sulfonamide is substantially completely dissolved.

2. A process for the preparation of a stable solution of a product of condensation of melamine with formaldehyde obtained by reacting melamine and formaldehyde in molecular ratios ranging between 1:2 and 1:4 to give a partial condensation product, consisting essentially of adding ortho-toluene sulfonamide, as a stabilizing agent, to the partial condensation product in aqueous alcoholic medium in a proportion of 0.05 to 0.15 mol of ortho-toluene sulfonamide per mol of melamine, the melamine-formaldehyde partial condensation product being obtained by reacting melamine and formaldehyde at 70 to 140° C. at a pH from 7.5 to 10.0 and in the presence of an aliphatic alcohol having less than 4 carbon atoms and continuing the condensation at least until the sulfonamide is substantially completely dissolved.

3. A process for the preparation of a stable solution of a product of condensation of melamine with formaldehyde obtained by reacting melamine and formaldehyde in molecular ratios ranging between 1:2 and 1:4 to give a partial condensation product, consisting essentially of adding para-toluene sulfonamide, as a stabilizing agent, to the partial condensation product in aqueous alcoholic medium in a proportion of 0.05 to 0.15 mol of paratoluene sulfonamide per mol of melamine, the melamine-formaldehyde partial condensation product being obtained by reacting melamine and formaldehyde at 70 to 140° C. at a pH from 7.5 to 10.0 and in the presence of an aliphatic alcohol having less than 4 carbon atoms, and continuing the condensation at least until the sulfonamide is substantially completely dissolved.

4. The process of claim 1, in which the formaldehyde is used in such proportion that to each —NH₂ group of the melamine-formaldehyde mixture there correspond from 0.7 to 1 mol of formaldehyde.

5. The process of claim 1, in which the aliphatic alcohol is taken from the group consisting of mono- and polyhydroxy alcohols and in which the alcohol is present in the initial reaction mixture in a proportion of 0.2 to 2.0 mols of alcohol per mol of melamine.

6. The process of claim 1, the alcohol being methanol.

7. The stabilized solution produced by the process of claim 1.

References Cited in the file of this patent

UNITED STATES PATENTS

| | | |
|---|---|---|
| 2,377,867 | D'Alelio | June 12, 1945 |
| 2,797,206 | Suen et al. | June 25, 1957 |